(12) United States Patent
Seth et al.

(10) Patent No.: US 10,146,883 B2
(45) Date of Patent: Dec. 4, 2018

(54) DETERMINING LABELS FROM SIMILAR GEOGRAPHIC FEATURES

(71) Applicant: Google Inc., Mountain View, CA (US)

(72) Inventors: Rohan Seth, San Francisco, CA (US); Joshua J. Sacks, San Carlos, CA (US); Michele Covell, Palo Alto, CA (US); Michael Chu, Los Altos Hills, CA (US); Shumeet Baluja, Leesburg, VA (US); David Marwood, San Francisco, CA (US)

(73) Assignee: Google LLC, Mounain View, CA (US)

( * ) Notice: Subject to any disclaimer, the term of this patent is extended or adjusted under 35 U.S.C. 154(b) by 0 days.

(21) Appl. No.: 14/879,350

(22) Filed: Oct. 9, 2015

(65) Prior Publication Data

US 2016/0034480 A1    Feb. 4, 2016

Related U.S. Application Data

(63) Continuation of application No. 13/111,459, filed on May 19, 2011, now Pat. No. 9,177,069.

(51) Int. Cl.
  *G06F 17/30* (2006.01)
(52) U.S. Cl.
  CPC .... *G06F 17/3087* (2013.01); *G06F 17/30241* (2013.01); *G06F 17/30333* (2013.01)
(58) Field of Classification Search
  None
  See application file for complete search history.

(56) References Cited

U.S. PATENT DOCUMENTS

| 7,487,145 B1 | 2/2009 | Gibbs et al. |
| 7,774,342 B1 | 8/2010 | Virdy |
| 8,095,412 B1 * | 1/2012 | Zias ............... G06Q 10/063 705/7.11 |

(Continued)

OTHER PUBLICATIONS

Szummer et al., Partially labeled classification with Markov random walks 2001, NIPS 2001. 8 pages.*

(Continued)

*Primary Examiner* — Jason G Liao
(74) *Attorney, Agent, or Firm* — Dority & Manning, P.A.

(57) ABSTRACT

Methods, systems, and apparatus, including computer programs encoded on a computer storage medium, including a method that comprises: determining a target geographic feature that has insufficient targeting information associated therewith, the target geographic feature defining a location; determining one or more similar geographic features to the target geographic feature, each geographic feature including targeting information, the determining based on shared excess queries that are shared between geographic features that are determined to be similar to the target geographic feature, wherein each excess query is a query associated with and exceeds an expected query count for each of the similar geographic features and the target geographic feature; attributing targeting information associated with at least one of the one or more similar geographic features to the target geographic feature; and serving content responsive to queries that relate to the target geographic feature based at least in part on the attributed targeting information.

19 Claims, 8 Drawing Sheets

(56) References Cited

U.S. PATENT DOCUMENTS

| 8,856,115 | B1 | 10/2014 | Huffman et al. | |
|---|---|---|---|---|
| 2005/0149303 | A1 | 7/2005 | Agrawala et al. | |
| 2007/0130203 | A1 | 6/2007 | Gulli et al. | |
| 2011/0035397 | A1 | 2/2011 | Joshi et al. | |
| 2011/0167077 | A1 | 7/2011 | Govani et al. | |
| 2011/0173217 | A1* | 7/2011 | Kasperski | G06F 17/3087 707/767 |
| 2014/0089336 | A1 | 3/2014 | Seefeld et al. | |
| 2014/0172843 | A1 | 6/2014 | Upstill et al. | |
| 2015/0019536 | A1 | 1/2015 | Schiller | |

OTHER PUBLICATIONS

Lafferty, "Ip.pdf" [date unknown, but verified as of Mar. 2, 2013], University of Chicago, https://galton.uchicago.edu/~lafferty/pdf/Ip.pdf.*

Lafferty, Index of /~lafferty/pdf Mar. 2, 2013, University of Chicago, https://galton.uchicago.edu/~lafferty/pdf/.*

Asadi et al., "Using Local Popularity of Web Resources for Geo-Ranking of Search Engine Results", World Wide Web, vol. 12, Issue 2, Jun. 2009, pp. 149-170.

Chien et al., "Semantic Similarity Between Search Engine Queries Using Temporal Correlation", 14$^{th}$ International Conference on World Wide Web, Chiba, Japan, May 10-14, 2005, pp. 2-11.

Ding et al., "Computing Geographical Scopes of Web Resources", 26$^{th}$ International Conference on Very Large Data Bases, Cairo, Egypt, Sep. 10-14, 2000, pp. 545-556.

Freyne et al., "Cooperating Search Communities", 4$^{th}$ International Conference on Adaptive Hypermedia and Adaptive Web-Based Systems, Dublin, Ireland, Jun. 21-23, 2006, pp. 101-110.

Wang et al., "Detecting Dominant Locations from Search Queries", 28$^{th}$ Annual International ACM SIGIR Conference on Research and Development in Information Retrieval, Salvador, Brazil, Aug. 15-19, 2005, pp. 424-431.

* cited by examiner

|  | 334a | 334b | 334c | 334d |
|---|---|---|---|---|
| City A 332a | Time Period 1 | Time Period 2 | Time Period 3 | Time Period 4 |
| Query | Excess Query Count | Excess Query Count | Excess Query Count | Excess Query Count |
| $Q_1$ | - | - | - | - |
| $Q_2$ | - | - | - | - |
| $Q_3$ | - | - | - | - |
| $Q_4$ | - | - | - | - |
| $Q_5$ | 2,000 | 4,000 | 6,000 | 2,000 |
| $Q_6$ | 500 | 500 | 500 | 500 |
| $Q_7$ | - | - | - | - |
| $Q_8$ | 4,000 | 3,000 | 4,000 | 3,000 |
| $Q_9$ | 100 | 100 | 100 | 100 |
| $Q_{10}$ | 200 | 200 | 200 | 200 |

|  | Time Period 1 | Time Period 2 | Time Period 3 | Time Period 4 |
|---|---|---|---|---|
| City B 332b |  |  |  |  |
| Query | Excess Query Count | Excess Query Count | Excess Query Count | Excess Query Count |
| $Q_1$ | - | - | - | - |
| $Q_2$ | - | - | - | - |
| $Q_3$ | - | - | - | - |
| $Q_4$ | - | - | - | - |
| $Q_5$ | 1,000 | 1,800 | 2,900 | 900 |
| $Q_6$ | 250 | 280 | 220 | 250 |
| $Q_7$ | - | - | - | - |
| $Q_8$ | 2,000 | 1,800 | 2,100 | 1,900 |
| $Q_9$ | 100 | 100 | 1,437 | 100 |
| $Q_{10}$ | 200 | 200 | 200 | 200 |

|  | Time Period 1 | Time Period 2 | Time Period 3 | Time Period 4 |
|---|---|---|---|---|
| City C 332c |  |  |  |  |
| Query | Excess Query Count | Excess Query Count | Excess Query Count | Excess Query Count |
| $Q_1$ | 9,000 | 9,000 | 9,000 | 9,000 |
| $Q_2$ | - | - | - | - |
| $Q_3$ | 7,000 | 6,000 | 8,000 | 7,000 |
| $Q_4$ | - | - | - | - |
| $Q_5$ | - | - | - | - |
| $Q_6$ | 12,000 | 14,000 | 8,000 | 11,000 |
| $Q_7$ | - | - | - | - |
| $Q_8$ | 3,000 | 3,000 | 3,000 | 3,000 |
| $Q_9$ | - | - | - | - |
| $Q_{10}$ | - | - | - | - |

Conclusion: City B is a similar geographic feature to City A — 336

DETERMINING LABELS FROM SIMILAR GEOGRAPHIC FEATURES

PRIORITY CLAIM

The present application is a continuation of U.S. application Ser. No. 13/111,459 having a filing date of May 19, 2011. Applicants claim priority to and benefit of all such applications and incorporate all such applications herein by reference.

BACKGROUND

This specification relates to information presentation.

The Internet provides access to a wide variety of resources such as video and audio files, web pages for particular subjects, book articles, and news articles. A search system can identify resources in response to a text query that includes one or more search terms or phrases. The search system can rank the resources based on their relevance to the query and on measures of quality of the resources and can provide search results that link to the identified resources. The search results are typically ordered for viewing according to the rank.

Some search systems can obtain or infer a location of a user device from which a search query was received and include local search results that are responsive to the search query. In some systems, local search results are search results that have been classified as having local significance to the particular location or to the location of the user device that submitted the query. For example, in response to a search query for "coffee shop," the search system may provide local search results that reference web pages for coffee shops near the location of the user device.

Some search queries may include location information as part of the query. For example, a search query may include a specific location, landmark, geographic feature, region or other location designator.

Still other queries may include terms that are more relevant to one or more geo-graphic locations or regions. For example, some users in some parts of the United States may submit the search query "rock quarry" more often than users in other areas. There may be one or more geographic regions where a rock quarry is a local tourist attraction, for example. The frequency of search queries, such as for "rock quarry," may change over time, and changes in the frequency may differ by geographic region.

SUMMARY

This specification describes technologies relating to information presentation. In general, one innovative aspect of the subject matter described in this specification can be implemented in methods that include a method that comprises: determining a target geographic feature that has insufficient targeting information associated therewith, the target geographic feature defining a location; determining one or more similar geographic features to the target geographic feature, each geographic feature including targeting information, the determining based on shared excess queries that are shared between the geographic features that are determined to be similar to the target geographic feature, wherein each excess query is a query associated with and exceeds an expected query count for each of the similar geographic features and the target geographic feature; attributing targeting information associated with at least one of the one or more similar geographic features to the target geographic feature; and serving content responsive to queries that relate to the target geographic feature based at least in part on the attributed targeting information.

These and other implementations can each optionally include one or more of the following features. Determining one or more similar geographic features can include determining one or more geographic features within a predetermined proximity of the target geographic feature. Each geographic feature can be a city. The geographic feature can be a cell in a hierarchical representation of geographic areas. The targeting information can include labels. The labels can be keywords. Serving content can comprise serving an advertisement. The method can further comprise: creating a graph of geographic features where 1) each vertex in the graph is a geographic feature and one or more geographic features includes one or more labels, 2) edges of the graph that connect the geographic features are weighted, and 3) geographic features that are found to be similar are connected in the graph along with connections to locations that are proximal to a given geographic feature; and propagating labels over the graph. Propagating the labels over the graph can include: at each vertex, initializing the labels associated therewith to an equal weight summing to a predetermined number; sending the labels across all connections associated with a given vertex; at each vertex, aggregating the labels received including scaling the weights of the labels; and repeating the sending until label weights stop changing over the graph. Determining excess queries can include: accessing a search query log that includes data specifying search queries corresponding to a particular geographic feature; and for at least one of the search queries corresponding to the particular geographic region: generating a geo-query count that represents a total number of times that the search query was received over a specified period; comparing the geo-query count to a corresponding expected query count for the search query, the expected query count being a baseline number of times that the query is expected to be received; and in response to determining that the search query has a geo-query count that exceeds the corresponding expected query count by at least a threshold amount, classifying the particular query as an excess query for the particular geographic feature. Determining one or more similar geographic features to the target geographic feature can include determining a number of excess queries in common between two geographic features. Determining one or more similar geographic features to the target geographic feature can include determining a similarity threshold equal to a minimum number of excess queries that must be shared between two geographic features in order to find similarity. Determining one or more similar geographic features to the target geographic feature can include determining one or more geographic features that share a number of excess queries that is greater than the similarity threshold for the target geographic feature.

Determining one or more similar geographic features to the target geographic feature can include determining a quality of the excess queries shared by the target geographic feature and the one or more similar geographic features. The quality can be measured based at least in part on a volume of queries associated with the excess queries. The quality can be measured using semantic clustering of terms by meaning. Determining one or more similar geographic features to the target geographic feature can include comparing a number of shared excess queries and a number of dissimilar excess queries for the target geographic feature and a candidate geographic feature. Comparing a number of dissimilar excess queries can include determining if the number of dissimilar excess queries exceeds a dissimilarity threshold, and determining that the target geographic feature and candidate geographic feature are not similar if the number of dissimilar excess queries exceeds the dissimilarity threshold. The method can further comprise: attributing information associated with one geographic feature with a similar geographic feature; and using the attributed information to target content to the similar geographic feature. The information can be targeting information. The information can be a label associated with the one geographic feature.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3C is a block diagram illustrating relationships among excess query counts for different geographic features over multiple time periods.

Like reference numbers and designations in the various drawings indicate like elements.

DETAILED DESCRIPTION

This document describes methods, processes and systems for determining labels for, and serving content to, geographic features for which insufficient targeting information exists. For example, a location, such as a remote and/or under-populated city in Wyoming, may have few (if any) keywords or labels associated with the location by which content, including ads, can be targeted. As a result, when insufficient labels exist, content that is served to a user in or related to the remote location may be generic, or chosen at random, and not targeted in particularly useful way. To alleviate this situation, similar geographic features, such as other cities that are similar to the remote Wyoming city, can be identified. The labels that correspond to content that is popular to users in the similar cities can be attributed to the Wyoming city. In response to a query or other request for content (e.g., an ad) by the user in the Wyoming city, content can be served that is targeted to the user using the attributed labels.

As an example, when a web page is served that is not the result of a search query, there may be no content on the web page from which to obtain targeting information, e.g., labels or keywords by which to select ads. In some implementations, targeting information can be obtained despite the lack of keywords in the content, such as if a location associated with the user device is available or a location can be inferred from the web page. The location can be used to identify other locations that are similar, and targeting information from those other locations can be used to serve content. Other methods for determining labels and serving content can be used.

Figure 1:
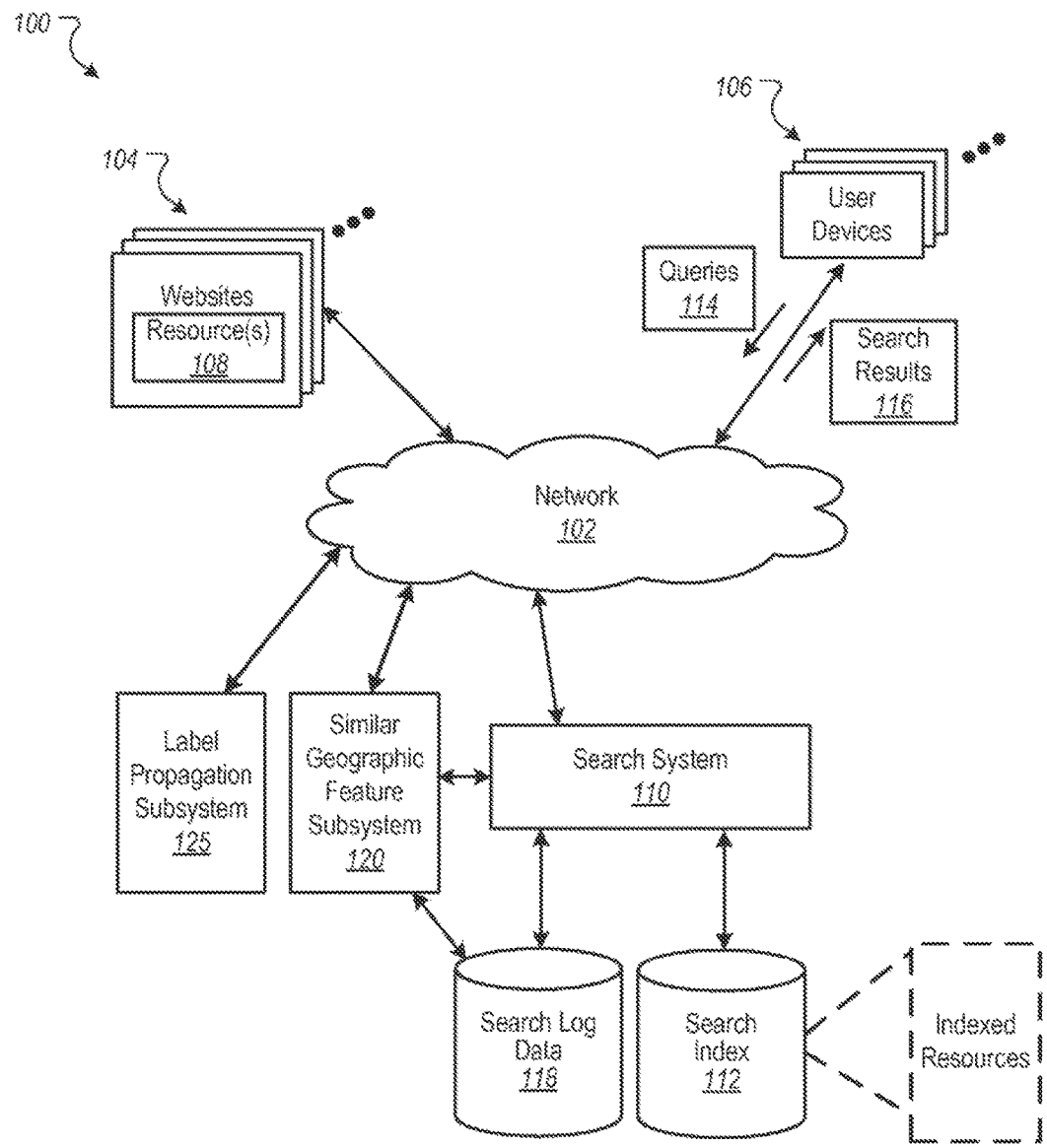
FIG. 1 is a block diagram of an example environment for determining, and targeting content to, similar geographic features.

FIG. 1 is a block diagram of an example environment 100 for determining, and targeting content to, similar geographic features. The environment 100 can target content to users within a geographic feature (e.g., a remote Wyoming city) using labels or keywords that correspond to content that is popular to users in similar cities. As an example, a target geographic feature (e.g., the remote Wyoming city) may be determined to have insufficient targeting information. One or more geographic features that are similar to the target geographic feature can be determined, where each similar geographic feature can include sufficient targeting information. For example, the similar geographic features may be other cities throughout the United States that are similar in some way to the remote Wyoming city. Targeting information associated with one or more of the similar geographic features can be attributed to the target geographic feature. For example, labels and keywords associated with similar other cities throughout the United States can be associated with the remote city in Wyoming. Using the targeting information, content responsive to queries from users in the target geographic feature can be served based at least in part on the attributed targeting information. For example, if a user in the remote Wyoming city issues a query, or a request for content occurs, content (e.g., an ad) that is targeted to the user in the remote Wyoming city can be selected.

The environment 100 includes a search system 110 that provides search services, a similar geographic feature subsystem 120 that can determine similar geographic features, and a label propagation subsystem 125 for propagating labels among similar geographic features. The environment 100 includes a network 102, e.g., a local area network (LAN), wide area network (WAN), the Internet, or a combination of them, that connects web sites 104, user devices 106, the search system 110, the query analysis subsystem 120, and a label propagation subsystem 125. The environment 100 may include many thousands of publishers and user devices 106.

The similar geographic feature subsystem 120 can determine, for any given geographic feature, one or more geographic features that are similar in some way. In some implementations, the similar geographic feature subsystem 120 can perform statistical analyses of queries for different geographic features (e.g., different cities) to determine similarities among the different geographic features. For example, the similar geographic feature subsystem 120 can use information from the search log data store 118 to identify cities that have statistically similar queries. In some implementations, the similar geographic feature subsystem 120 can be implemented as an element of the search system 110. In some implementations, the similar geographic feature subsystem 120 can be implemented in a data processing apparatus that communicates over the network 102 with the search system 110.

In some implementations, the determination of similarities among the different geographic features can be based on analyzing queries for multiple time periods, where the multiple time periods evaluated are the same for each geographic feature. For example, using the multiple time periods, trends can be determined for a particular geographic feature (e.g., queries for a product in a West Coast high-tech city). The trends can be used, for example, to target ads or other content to similar geographic features (e.g., East Coast cities that have a high-tech similarity to the West Coast high-tech city). In this example, the two cities are may be similar because, over time, they have had similar patterns of excess queries, e.g., related to high-tech products or subjects.

Other methods can be used to determine similarity. In some implementations, similarity can be determined based on one or more physical features associated with a target feature. Physical features can includes the size, area, population, climate, number of roads, parks, stoplights or other physical features associated with a given geographic feature. In some implementations, physical proximity can be used to determine similarity. Other means of determining similarity are possible.

The label propagation subsystem 125 can propagate keywords or labels from one or more geographic features to one or more other geographic features. For example, keywords or labels can be associated with the remote Wyoming city, where the keywords or labels are attributed based on their association with one or more other similar geographic features to the remote Wyoming city. In some implementations, the attributed information can be a label associated with the one geographic feature. For example, the label can correspond to a push-pin on a map location that is labeled with the geographic feature.

The use of propagated labels among similar geographic features can occur, for example, when serving content (e.g., ads) for a user in a certain geographic feature, such as a city or other location. The content that is served can be based on the location, such as if the location associated with the user device is available or the location can be inferred from a web page displayed on the user device.

The location of the user device can be determined in different ways. In some implementations, such as if the user is using a mobile device (e.g., a mobile phone, smartphone, etc.), the location can be determined from the current physical location of the user device. For example, if the mobile device is GPS-enabled, then the location can include the latitude and longitude of the mobile device that are obtained using the GPS capabilities of the mobile device. In another example, the location of the mobile device can be obtained through cell triangulation, e.g., from three or more signal transmitters, towers or satellites that serve the mobile device. In another example, the location of the mobile device can be obtained through periodic mobile check-ins. In some implementations, if the user has a map displayed in a map application, for example, then the location can be obtained from the coordinates of the map's center-point (or other position), using the viewport of the device.

In some implementations, the location of the user device can be determined based on the user device's connection to a mobile or wireless network, such as the Internet. For example, if the user of the user device is on the Web using a map application, then the location of the user device can be determined from driving directions that the user has requested and/or that have been provided by the map application. In some implementations, the driving directions can be parsed to locate and extract names (e.g., business names, street names, city names, etc.) of specific locations. Using a name obtained from the driving directions, for example, a reverse look-up can be performed to obtain an IP address that corresponds to the name (e.g., a business name, street name, etc.), and then the geographical location can be determined from the IP address.

Once the location of the user device is known, for example, if targeting information (e.g., keywords) associated with the location is available, then the targeting information can be used as terms for serving content. In some implementations, keywords can be identified based on past queries that have originated from the area around the location. For example, labels can be applied to each location on the Earth's surface (e.g., based on historical queries that are presented from each area or relate to the area). The historical queries can be anonymized so that the privacy of users is protected. For example, quasi-unique identifiers can be associated with users, but the actual identifying information of the users is not stored in the historical queries. Additionally, any identified user preferences or user interactions can be generalized (for example, generalized based on user demographics) rather than associated with a particular user. Encryption and obfuscation techniques can also be used to protect the privacy of users.

The targeting information that is associated with a location can be assigned in various ways. For example, the keyword terms selected for the location can be based on the queries that occurred the most frequently over time for or from that location. In some implementations, the keywords that are associated with a location can be based on keywords that are associated with one or more similar locations.

Knowledge of similar geographic features can be used, at least in part, to identify labels among similar geographic features. For example, labels may not be available in areas where there is little underlying data, such as remote areas or other places where few queries are submitted. Labels can be derived by attribution from similar geographic features. In this case, geographic proximity is not a factor in determining those labels. Labels can also be generated using hierarchical representations of geographic areas. For example, using a process that uses connected nodes in graphs, and further using connections among cells that map to geographic areas, advertising labels can be attributed from nearby geographic features. In this case, geographic proximity is a factor in determining advertising for the remote areas.

Labels can be used to target ads to individuals. Ad targeting can use labels obtained from keywords entered as part of a search query or from content on resulting search result pages. However, in the absence of these specifically provided inputs, other signals are required for effective targeting. A system and method are proposed that can attribute labels to locations, such as for example locations that are presented on an on-line map web site. In some implementations, a graph-based propagation system can be used to spread labels to regions with little underlying data. In some implementations, the graph-based propagation system can, at least in part, rely upon knowledge of excess queries, such as excess queries that are shared among similar geographic features.

In some implementations, geographic features can be represented by (or contained in) one or more cells (e.g., geo-cells, or g-cells) in a hierarchical representation or mapping of geographic areas. For example, each hierarchical level of g-cells can include cells that represent a complete tiling of the Earth's surface. The g-cells can represent any type of location, including geographic features, named landmarks, cities, state, regions, ZIP codes, or other geographic areas.

Referring again to FIG. 1, a web site 104 can include one or more resources 108 associated with a domain name and hosted by one or more servers. An example web site is a collection of web pages formatted in hypertext markup language (HTML) that can contain text, images, multimedia content, and programming elements (e.g., scripts). Each web site 104 can be maintained by a publisher, e.g., an entity that manages and/or owns the web property.

A resource 108 is any data that can be provided by the web site 104 over the network 102 and that is associated with a resource address. Resources 108 include HTML pages, word processing documents, portable document format (PDF) documents, images, video, and feed sources, to name a few examples. The resources 108 can include content, e.g., words, phrases, images and sounds, and may include embedded information (e.g., meta information and hyperlinks) and/or embedded instructions (e.g., JavaScript scripts).

A user device 106 is an electronic device that is under control of a user and is capable of requesting and receiving resources over the network 102. Example user devices 106 include personal computers, mobile communication devices (e.g., smartphones), and other devices that can send and receive data over the network 102. A user device 106 typically includes a user application, e.g., a web browser, to facilitate the sending and receiving of data over the network 102.

To facilitate searching of resources 108, the search system 110 can identify the resources 108 by crawling and indexing the resources 108 provided by the web sites 104. Data about the resources 108 can be indexed based on the resource 108 to which the data corresponds. The indexed and, optionally, cached copies of the resources 108 are stored in a search index 112.

The user devices 106 submit search queries 114 to the search system 110. In response, the search system 110 accesses the search index 112 to identify resources 108 that are predicted to be relevant to the search query 114, for example based on relevance scores that have been computed for the resources 108. The search system 110 selects resources 108, generates search results 116 that identify the resources 108, and returns the search results 116 to the user devices 106. A search result 116 is data generated by the search system 110 that references a resource 108 that is responsive to a particular search query, and includes an active link (e.g., a URL) to the resource. An example search result 116 can include a web page title, a snippet of text or a portion of an image extracted from the web page, and the URL of the web page.

User devices 106 receive the search results 116 and render the search results 116, for example, in the form of one or more web pages, for presentation to users. In response to the user selecting a link (e.g., URL) in a search result at a user device 106, the user device 106 requests the resource 108 referenced by the link. The web site 104 hosting the resource 108 receives the request for the resource 108 from the user device 106 and provides the resource 108 to the requesting user device 106.

Search queries 114 submitted during user sessions are stored in a data store such as the search log data store 118. Selection data specifying user actions taken in response to search results 116 provided are also stored in a data store such as the search log data store 118. These actions can include whether a search result was selected by a user. The data stored in the search log data store 118 can be used to map search queries 114 submitted during search sessions to resources 108 that were identified in search results 116 and the actions taken by users.

Search results 116 are selected to be provided to a user device 106 in response to a search query 114 based on initial result scores. Result scores are scores that represent a measure of relevance (e.g., a predicted relevance) of the resource 108 to a search query. For example, a result score for a resource 108 can be computed based on an information retrieval ("IR") score corresponding to the resource 108 and, optionally, a quality score of the resource 108 relative to other available resources. A presentation order for the search results 116 can be selected based on the result scores. In turn, data that causes presentation of the search results 116 according to the presentation order can be provided to the user device 106.

In some implementations, the relevance of a particular resource to a particular search query can be determined, in part, through statistical analysis of search log data 118. Search log data is data that specifies search queries received from users and subsequent user selections (i.e., clicks) of particular search results. For example, information in the search log data store 118 may specify that the search query "football" was received from 1,000,000 users, and that 100,000 of these users subsequently selected a search result referencing a web page for a professional football league, while 150,000 of these users selected a web page for to a college football league.

Figure 2:
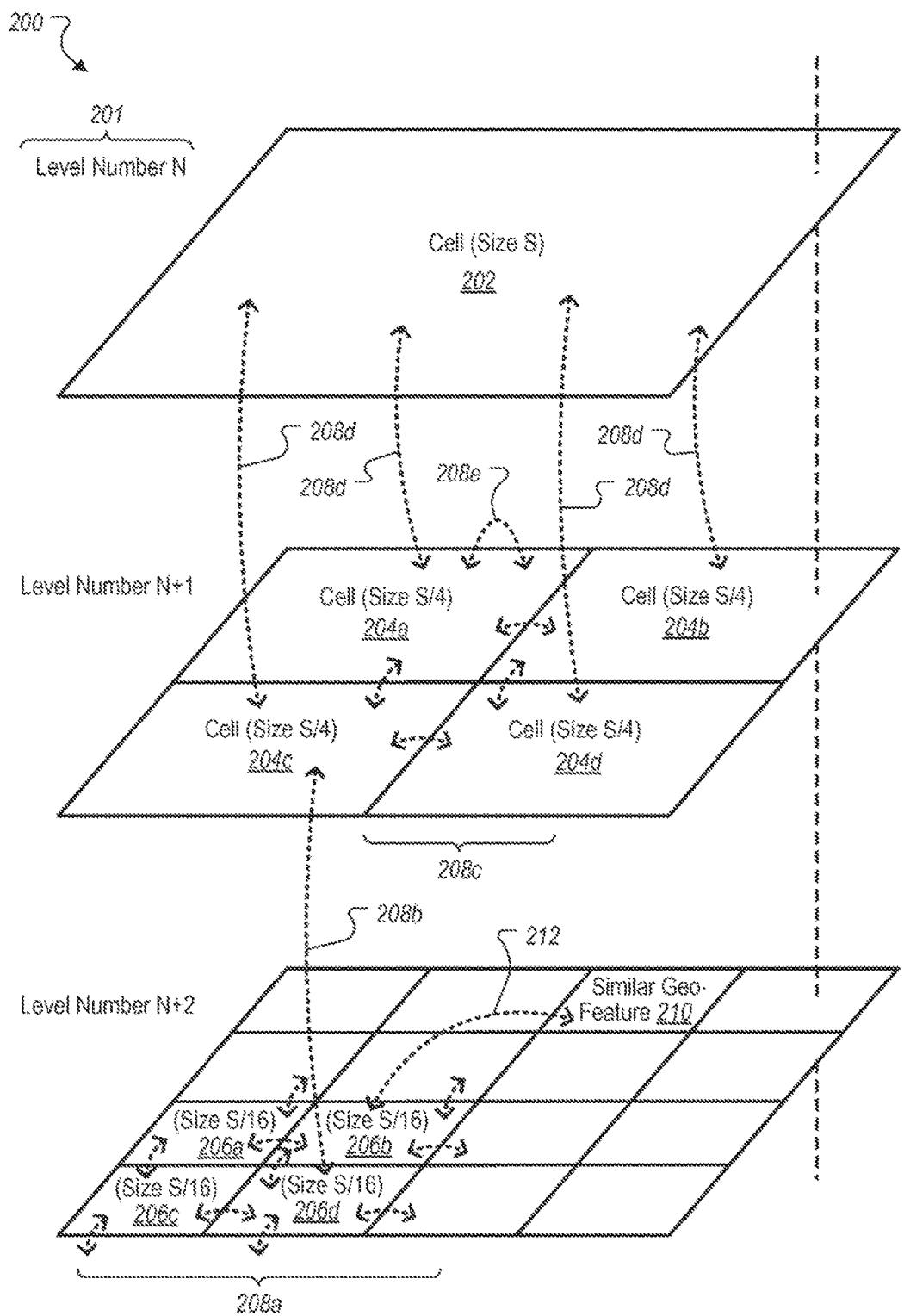
FIG. 2 shows an example hierarchical cell representation.

FIG. 2 shows an example hierarchical cell representation 200. In some implementations, propagation of labels can occur between cells, where the cells represent nodes in a graph, and connections between nodes (or edges between vertices in the graph) can represent paths in the data structure by which labels can be propagated. In some implementations, edges can exist between nodes at different levels in a hierarchy of cells.

The number of g-cells at each hierarchical level can vary, where g-cells at the numerically lowest level number (e.g., level 0) can have the largest g-cells. In some implementations, each g-cell of size S at a level number N can include (or cover the same region as) four g-cells of size S/4 at the next hierarchically lower level (e.g., level number N+1). At level number N+2, for example, the size of the g-cells can be S/16, based on the size S at level number 0, and so on for increasingly smaller g-cells at level numbers N+3, N+4, etc. As a result, g-cells using the 4:1 hierarchical parent-child size ratio in this way can be called "quad" cells. In some implementations, other parent-child size ratios can be used.

The g-cells used in the hierarchical representation of geographic areas can have labels or terms associated with them. Here, the words "label" and "term" can be used interchangeably for each of the g-cells that correspond to the populated areas. The associations can be determined based on queries in those areas, such as by scraping the search log data store 118. In densely-populated areas, for example, there can be plenty of queries that result in a significantly large number of good labels. However, in predominantly rural locations, for example, there may not be enough past queries to reliably assign labels. As an example, for regions in remote parts of this or other countries, the regions may have few users who issue enough queries to associate labels with all of the g-cells.

To overcome the problem of g-cells with less-than-adequate associated terms or labels, a graph-based propagation system can be used to propagate labels to adjacent g-cells. For example, one or more graphs can be defined over the g-cell structure, using the cells as components or vertices of the graphs. In some implementations, within the graph, each g-cell can be a vertex, each g-cell can be connected to itself, each g-cell can be connected to its four neighbors (e.g., each of the g-cells directly to the north, south, east and west), and each g-cell can be connected to its parent. Parent connections, for example, can be between 10 each of four child cells (e.g., of size S/4) at the level number N+1 to their parent (e.g., of size S) at the level number N. Each of the connections between nodes or vertices in the graph can be or represent an "edge" of the graph.

For example, in the hierarchical cell representation 200, three example levels 201 of cells are indicated. At the level number N, for example, cell 202 has a size S. At the next hierarchically lower level number N+1, for example, cells 204a-204d have a size S/4, or one-fourth the size of cell 202. Further, at the next hierarchically lower level number N+2, for example, cells 206a-206d have a size S/16, or one-fourth of the size of cells 204a-204d, and one-sixteenth of the size of cell 202. The cell 202 can be one of several thousand or more cells at level number N, each cell being hierarchically related to smaller cells. Arrows 208a-20 208d represent a few of the possible edges that can be formed when the cells 202-206d are used as nodes in a graph for propagating labels between nodes. For example, arrows 208a represent edges among level number N+2 nodes (e.g., cells 206a-206d) using adjacent cells in the north, south, east and west directions. Arrow 208b represents an edge that connects the child node, cell 206d, to its parent node, cell 204c. Arrows 208c represent edges among level number N+1 nodes (e.g., cells 204a-204d) using adjacent cells in the north, south, east and west directions. Arrow 208d represents an edge that connects the child nodes, cells 204a-204d, to their parent node, cell 202. Arrow 208e represents an edge that connects the node for the cell 204a to itself.

In some implementations, g-cells can also be used to represent groups of similar geographic features, such as two Cities A and B that are determined to be similar cities based on various criteria, including non-proximity-based criteria. For example, g-cells that represent those similar geographic features, though not adjacent to cells 202, 204a-204d and/or 206a-206d, can also produce connections (or edges) among vertices in the graph. In this way, labels can be propagated throughout the nodes in the hierarchical cell representation 200 that represent similar geographic features. The propagation can occur among nodes for cells 202, 204a-204d and/or 206a-206d as well as nodes representing similar geographic features, which in some cases can be the same nodes. In one example of cells for similar geographic features, a cell 210 (e.g., representing San Francisco) can represent a geographic feature that is similar to one of the cells 206b. An arrow 210 represents an edge that connects the nodes representing similar geographic features, meaning that labels can be propagated between the nodes, thus the similar geographic features they represent.

Some implementations can use the queries and query counts for similar geographic features such as Cities A and B to populate g-cells and nodes in the graph. For example, if City A is represented as a node in the graph, then the labels that are associated with the node can include queries for which query counts are the highest relative to other query counts. These queries and their associated query counts can be used to assign label weights in each node based on the frequencies of queries. For example, g-cells and nodes in the graph can use information from excess queries and query counts described below with reference to FIGS. 3A-3C.

In some implementations, when using g-cells to represent similar geographic features determined from excess queries, the smallest g-cell level number (e.g., N+2) that fully covers the geographic feature can be used. For example, when San Francisco is represented in the graph in this way, a single g-cell can be used, rather that two or more g-cells at the next hierarchically lower level (e.g., where the cell sizes are one-fourth as small).

Once a graph structure is produced, weights can be assigned to each of the edges (e.g., each of the connections between pairs of vertices). In some implementations, sample weights can include: a weight of 10 for a connection from a g-cell to itself, a weight of 1 for each connection from a g-cell to its four immediate neighboring g-cells, a weight of 1 for a connection between g-cells that represent two similar geographic features (e.g., Cities A and B) at the same level number, a weight of 0.25 for a connection from a g-cell to its parent, and 0.0 for other connections. In some implementations, other weights can be used and/or other connections can be made (e.g., between diagonally-adjacent g-cells).

In some implementations, labels for a feature can be weighted. For example, the geographic feature San Francisco may have a "tech" label with a weight of 0.7 and a "hipster" label with a weight of 0.3. Once the graph is generated and the weights are assigned to the edges (and optionally, labels), the propagation of labels among g-cells to g-cells can begin. In some implementations, one form of propagation can be based on absorption. For example, in an absorption process, each adjacent g-cell can absorb information from its neighbors, which can have previously absorbed information from their neighbors, and so on in a process that can be repeated iteratively.

In some implementations, in a first general step of the absorption process, for example, the labels at each vertex can be initialized to equal weights that sum to a pre-determined number (e.g., 1.0). If, for example, there are 10 labels at a vertex A, each label can be assigned a weight of 0.1.

Next (e.g., second), during the absorption process, the labels at any one vertex can be sent across, or propagated to, each of the nodes to which the vertex is connected (e.g., as represented by edges connecting the vertex to nodes in the graph). In some implementations, the weight of the label at the recipient vertex can be computed as the product of the weight of label at the origination node times the weight of the connection. For example, when propagating one often labels (e.g., each having a label weight of 0.1) from the g-cell representing San Francisco to the g-cell representing Cambridge (e.g., a similar city to San Francisco), the label weight of 0.1 can be multiplied by the edge or connection weight (e.g., 15), resulting in a received label score of 1.5. If per-label weights are used, then the received label score can be modified to use that weight as well. For example, multiplying the received label score of 1.5 by the "tech" label weight of 0.7 results in a modified received label score of 1.05.

Each vertex can aggregate the label score for the same label. For example, a vertex may receive the same label from multiple inbound connections, including its own connections. As a result, the total label score for a vertex can be the sum of the label scores for that label, where each label score can be computed as the product of the weight of the label at the origination node times the weight of the connection.

At each vertex, the total scores can be scaled to sum to 1.0. For example, if the total label scores at a vertex are 15, 25, 20 and 40, then the scaled scores can be 0.15, 0.25, 0.2 and 0.4, the four of which sum to a pre-determined number (e.g., 1.0).

The description that follows describes methods that can be performed to facilitate identification of excess queries for multiple geographic features, and to use the excess queries to identify similar geographic features. These processes can be performed on any number of queries and geographic features, as well as the time periods over which the queries were received from users associated with the geographic features. Similar geographic features that are identified from excess queries, for example, can be used in the graph-based propagation system, such as to propagate labels from geographic features having sufficient targeting information to similar geographic features having insufficient targeting information.

A search query can be identified as a geographically local ("local") search query for a particular geographic feature (e.g., a geographic region, such as a city) based on a number of times that the search query is received from users located in the particular geographic region. This quantification can be referred to as a geo-query count for the particular geographic region. For example, the geo-query count for a particular geographic region can be compared to a corresponding expected query count for that geographic region to determine whether the geo-query count exceeds the corresponding expected query count. If the geo-query count exceeds the expected query count by a pre-determined threshold, for example, then the search query can be classified as a local search query for the particular geographic region. In some implementations, this same type of processing can be done without thresholding, such as using a continuous measure of excess (e.g., as a percent increase above the expected query count).

The expected query count is a baseline number of queries that are expected to be received, over a specified period of time, from user devices in the particular geographic region. The expected query count can be computed, for example, based on a query share for the query and a total number of queries that have been received from user devices in the particular geographic region. The query share represents a portion of the total queries that are expected to match the search query. For example, the query share can be computed as a ratio of the number of times that the search query was received from user devices in a baseline, or reference, geographic region (e.g., the United States of America) relative to the total number of queries that have been received from user devices in the baseline geographic region. The query share for the query can be multiplied by the total number of queries received from user devices in the particular geographic region to compute the expected query count for the query.

When determining whether a query is a local query, the amount by which the geo-query count exceeds the expected query count is an excess query count. For example, the excess query count can correspond to a particular query for a given geographic feature over a specific time period. Excess query counts can also be determined for other geographic features and other time periods, and the information can be stored. By comparing excess query counts for different geographic features over multiple time periods, similarities among different geographic features can be determined. As a result, for any given geographic feature, one or more other similar geographic features can be determined. For example, for San Francisco, one or more other cities in the United States can be determined to be similar cities based on similarities among the excess query counts for San Francisco and the other cities.

Figure 3A:
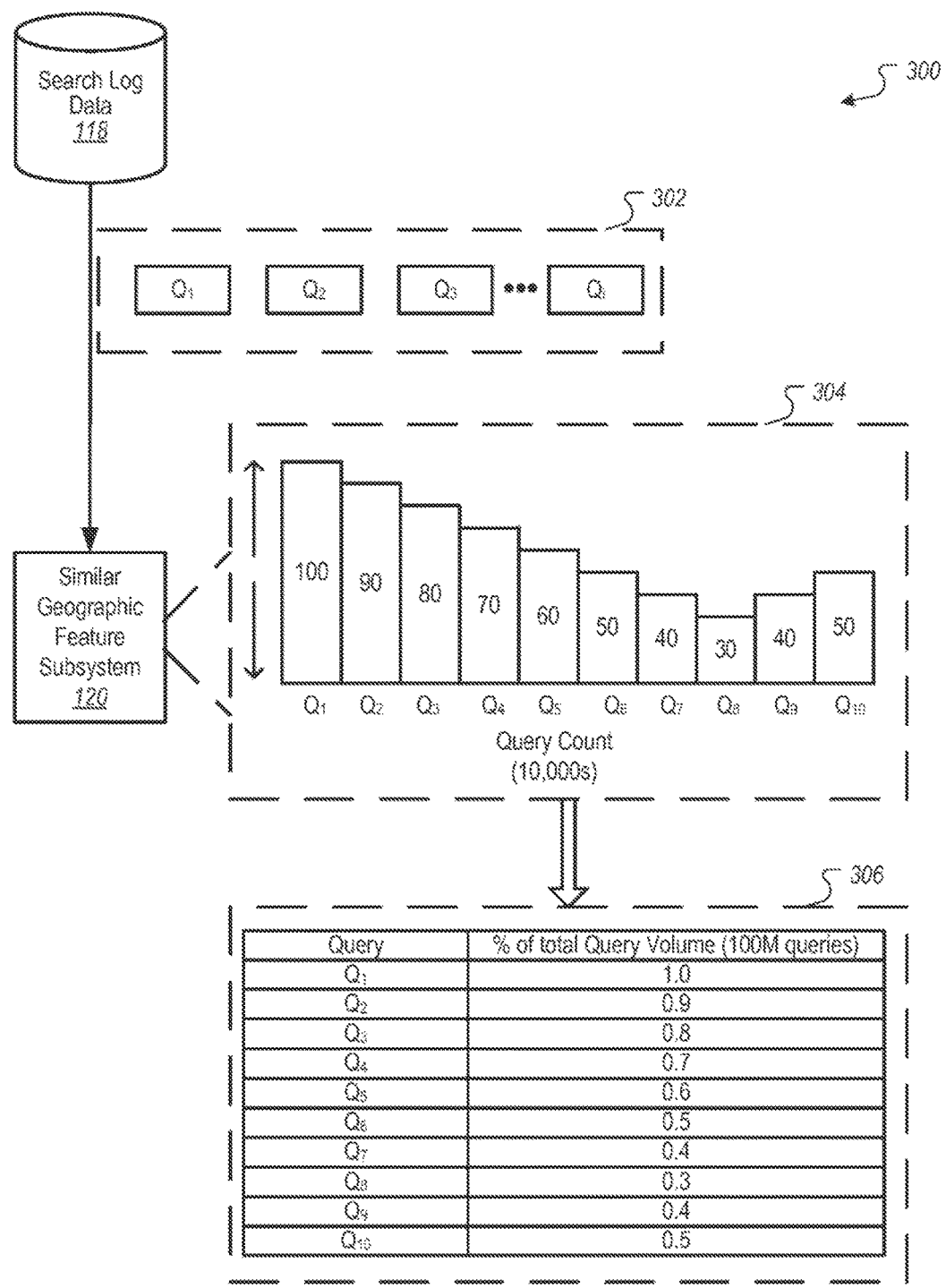
FIGS. 3A and 3B are block diagrams illustrating data flows corresponding to classification of search queries as excess queries.
Figure 3B:
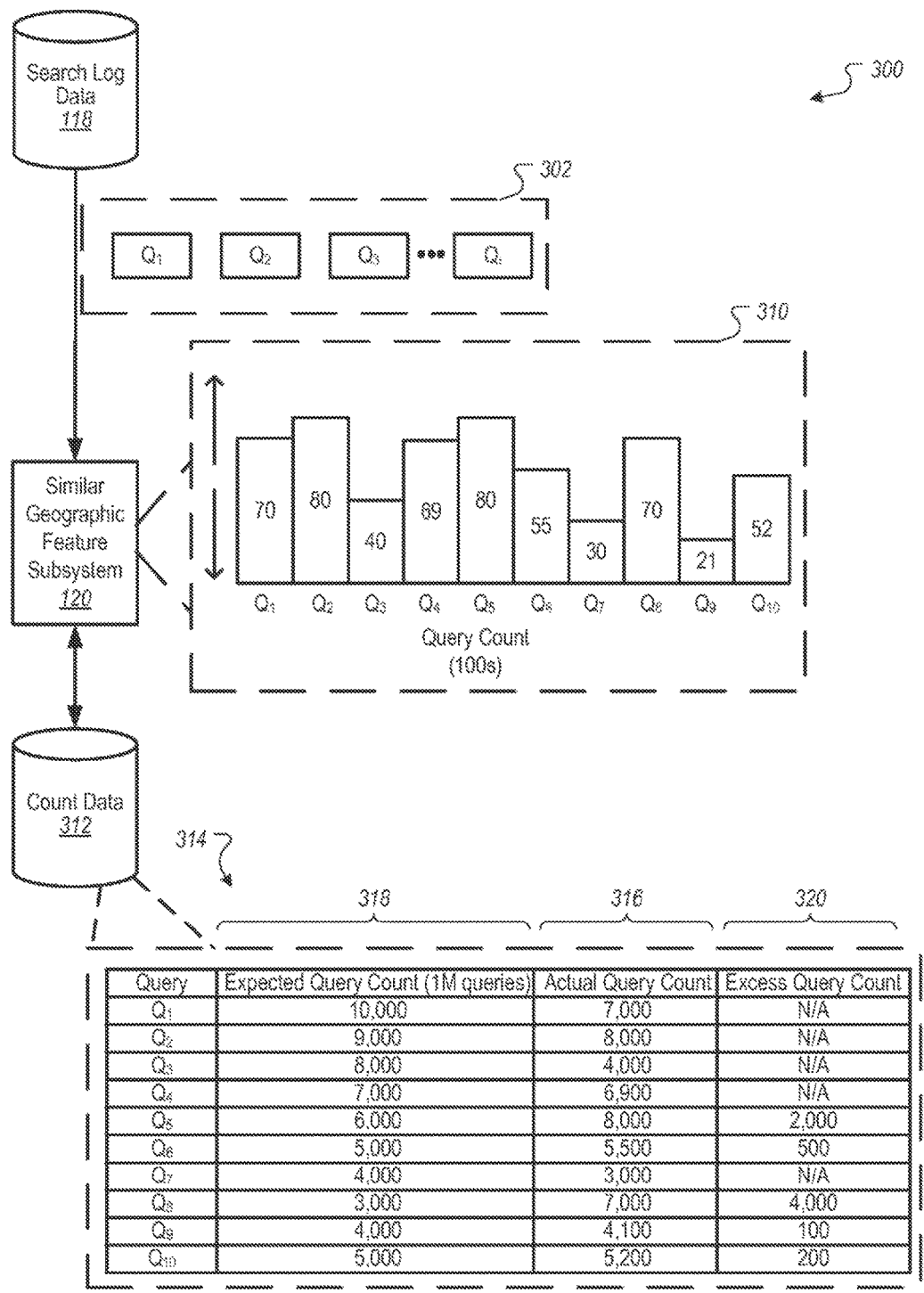

FIGS. 3A and 3B are block diagrams illustrating data flows 300 corresponding to the identification of excess queries. In some implementations, the similar geographic feature subsystem 120 can receive search query log 302 from the search log data store 118. The search query log 302 includes queries ($Q_1$-$Q_i$) that were received from users, and data specifying the locations from which the queries were received. In some implementations, the search query log 302 can include all queries that were received from users in a baseline (or reference) geographic region. For example, the search query log 302 can include search queries that were received from all users within the continental United States. In some implementations, the search query log 302 can include only queries that were received from users at least a threshold or minimum number of times. For example, the queries included in the search query log 302 can include queries that were received at least a statistically relevant number of times (e.g., relative to a total number of queries received).

In some implementations, the search query log 302 received by the similar geographic feature subsystem 120 is a set of search queries that were received from users over a specified period. The specified period can be, for example, a specified amount of time or a specified number of events. For example, the search query log 302 can include or specify search queries that were received from users over a previous calendar month (or year) or the past 100,000,000 search queries that have been received.

The similar geographic feature subsystem 120 can analyze the search query log 302 to obtain a query landscape 304 for the search query log 302. A query landscape is a collection of queries and a corresponding number of times that each of the search queries was received from user devices. In some implementations, the query landscape 304 can be obtained using a subset of the search query log 302. For example, the query landscape 304 can be obtained by selecting a threshold number queries that were received more often than the remaining queries. For illustrative purposes only, 10 queries ($Q_1$ through $Q_{10}$) are selected and included in FIG. 3A; however, thousands or even millions of queries can be selected for the query landscape 304. Alternatively, the query landscape 304 can also include each query that was included in the search query log 302.

In the example shown, the query landscape 304 includes a reference to each of the ten queries and a corresponding number of times that each query was received from user devices over the specified period. For example, according to the query landscape 304, the query $Q_1$ was received 1,000,000 times over the specified period, while the query $Q_7$ was received 400,000 times over the specified period.

Using the query landscape 304, the similar geographic feature subsystem 120 can determine a set of query shares 306, including a query share for each of the queries ($Q_1$-$Q_{10}$) in the query landscape 304. A query share for a query is a measure of the query count for the query relative to the total number of queries that were received. For example, the total number of queries that are counted in the query shares can be each of the queries specified by the search log data as being received over a specified period. In some implementations, the query share for each of the queries ($Q_1$-$Q_{10}$) can be computed as a ratio of the query count relative to the total number of queries (i.e., Query Share=Query Count/Total Queries received over specified period). For example, the query share for the query $Q_1$ has been computed to be 1.0% (i.e., 1,000,000/100,000,000), and the query share for the query $Q_7$ has been computed to be 0.4% (i.e., 400,000/100,000,000). To give the query shares a concrete context, for example, the query $Q_1$ (e.g., for "football") can have a nationwide occurrence percentage of 1.0% relative to all nationwide queries (e.g., including queries for "football"). Similarly, the query $Q'$ (e.g., for "pie") can have a nationwide percentage of 0.4% relative to all nationwide queries. The percentages are relative to queries that occur during the given time period.

Referring now to FIG. 3B, the similar geographic feature subsystem 120 can also analyze the search query log 302 to identify search queries that were received from user devices located in a particular geographic region. As described previously, each query can have a corresponding geographic identifier that specifies a location of the user device that submitted the query. The similar geographic feature subsystem 120 can use these geographic identifiers to filter the search query data 202 to select only queries that were received from user devices in a particular geographic region.

In some implementations, the corresponding geographic identifier for each query can correspond to or specify a latitude and a longitude representing the location of the user device that submitted the search query. The geographic identifier can also be, for example, a ZIP code corresponding to the location of the user device that submitted the query, a city in which the user device is located, an area that is represented by a reference location and a specified distance from the reference location (e.g., a distance from a coordinate or city center), or some other geographic identifier.

A latitude and longitude for each query can be obtained based on user profile data provided by the user and/or an anonymized Internet Protocol (IP) address (e.g., a hash value computed using the IP address) corresponding to a user's device. When the user device is a mobile device (e.g., cell phone, Personal Data Assistant, smartphone, or other portable data communications device), the location of the user device can also be provided by location-based services (e.g., GPS) that have been enabled for the user device.

Using the geographic identifiers, the similar geographic feature subsystem 120 can determine a total number of queries that have been received from user devices in the particular geographic region. For example, the similar geographic feature subsystem 120 can compute a sum of all queries received from user devices located in the particular geographic region over the specified period. The similar geographic feature subsystem 120 can also determine, for each search query received over the specified period, a geo-query count. A geo-query count is a value that represents a total number of times that one or more queries were received from user devices in the particular geographic region. The similar geographic feature subsystem 120 can compute, for the specified period, a total geo-query count that represents a total number of search queries that were received from user devices in the particular geographic region.

The geo-query counts for the queries can be used to obtain a geo-query landscape 310 that is a collection of queries received for a particular geographic region and corresponding numbers of times that the queries were each received from user devices in the particular geographic region over a given time period. For example, the geo-query landscape 310 specifies that the query $Q_1$ was received 7,000 times and that the query $Q_8$ was received 8,000 times, such as over the same 24-hour period. The geo-query landscape 310 can be stored, for example, in a count data store 312. The geo-query counts obtained from the geo-query landscape 310 can be indexed, for example, based on the query to which they correspond. For example, the query $Q_1$ can be used to index information in the geo-query landscape 310 for the current geographic region or for similar data in the geo-query landscape 310 for other geographic regions. As an example, the index for the query $Q_1$ can be used to look up geo-query landscape 310 information for multiple geographic regions, such as to compare geo-query counts for individual queries (e.g., ($Q_1$-$Q_{10}$)) across multiple geographic regions.

A table 314 lists the geo-query counts for the queries ($Q_1$-$Q_{10}$) in an actual query count column 316 titled "Actual Query Count." The values in the actual query count column 316 correspond to the geo-query count values in the geo-query landscape 310 for the current geographic region over the current time period. The actual query count values can be used for comparison with expected query counts for the same queries.

The similar geographic feature subsystem 120 can use the total geo-query count for a particular geographic region to obtain an expected query count for each of the queries. In some implementations, the similar geographic feature subsystem 120 can obtain the expected query count for each query by multiplying the total geo-query count by the query share that was computed for the query (i.e., (expected query count)=(total geo-query count)*(query share)). For example, if the total geo-query count is 1,000,000, then the expected query count for the query $Q_1$ is computed to be 10,000 (i.e., 10,000=1,000,000*0.01). Similarly, the expected query count for the query $Q_8$ is computed to be 7,000 (i.e., 7,000=1,000,000*0.007). To give the expected query count a concrete context, the queries $Q_1$ and $Q_8$ are expected to occur 10,000 and 7,000 times, respectively, within the given time period for the geographic feature. The expected query counts for the queries can be stored, for example, in the count data store 312 and indexed based on the query to which each of the expected query counts correspond. For example, the table 314 lists the expected query counts for the queries ($Q_1$-$Q_{10}$) in an expected query count column 318 titled "Expected Query Count."

The similar geographic feature subsystem 120 can compare the geo-query counts for each of the queries to the corresponding expected query count for each query to determine whether the geo-query count for the query exceeds the expected query count. Referring to FIG. 3B, for example, the similar geographic feature subsystem 120 can compare values in the actual query count column 316 to values in the expected query count column 318 to determine values in an excess query count column 320. For example, comparing the geo-query counts to the expected query counts reveals that the geo-query counts for the queries $Q_1$-$Q_4$ and $Q_7$ fail to exceed the corresponding expected query counts for these queries, thus resulting in "N/A" entries in the excess query count column 320 for those queries. However, the comparisons also reveal that the geo-query counts for the queries $Q_5$, $Q_6$, and $Q_8$-$Q_{10}$ do exceed the corresponding expected query counts for these queries. Namely, the queries $Q_5$, $Q_6$, and $Q_8$-$Q_{10}$ from the particular geographic region were submitted in excess of what is expected. As a result, the entries in the excess query count column 320 for those queries are positive values. The values represent the difference between actual and expected query counts, from columns 316 and 318, respectively. Specifically, the excess query count for the query Q5 is 2000 (e.g., 8000-6000), and so on. Thus, these queries may be locally significant queries for the particular geographic region, and may qualify to be classified as local queries.

In some implementations, the similar geographic feature subsystem 120 can classify, as a local query, any query having a geo-query count that exceeds the corresponding expected query count. In some implementations, the similar geographic feature subsystem 120 can require that a local query be a query for which the geo-query count exceeds the corresponding expected query count by at least a threshold amount.

For example, the similar geographic feature subsystem 120 can require that the geo-query count exceed the expected query count by a specified percentage (e.g., 20%) or by an absolute number (e.g., 1,000). The similar geographic feature subsystem 120 can also require that each query that is classified as a local query be one of N queries (e.g., 10, 100 or 1,000 queries) having geo-query counts that exceed the corresponding expected query counts by the highest amount. Assuming that the similar geographic feature subsystem 120 requires local queries to have a geo-query count that exceeds the expected query count by at least 40%, the queries $Q_5$ and $Q_8$ would qualify to be classified as local queries for the particular geographic region.

As described previously, search queries can be received from a number of different user devices (e.g., desktop personal computers or mobile devices). However, users that submit queries from a mobile device are generally more likely to be searching for local search results than users that submit queries from a desktop computing device. Therefore, the query landscapes for queries submitted using mobile devices can be substantially different than the query landscapes for queries submitted using other devices.

In some implementations, a query landscape can be generated using search queries that were received from mobile user devices (e.g., cell phones), and a separate query landscape can be generated using search queries that were received from other user devices (e.g., personal computers). In other words, the query landscapes can be partitioned according to the different types of devices that were used to submit the queries. In some implementations, separate query shares (e.g., a mobile device query share and a query share for other non-mobile devices) can be generated using the separate query landscapes. In turn, separate expected query counts (e.g., a mobile expected query count and an expected query count for other, non-mobile devices) can be computed using the separate query shares and the total geo-query count for the particular geographic region. Once the separate expected query counts have been computed, a particular search query can be classified as a local and/or non-local query using the separate expected query counts.

For example, if the particular search query has been received from non-mobile user devices located in the particular geographic region, and the particular search query has an actual query count that is more than the expected non-mobile query count, then the particular search query can be classified as a local query for non-mobile devices. However, if the particular search query has been received from mobile user devices located in the particular geographic region, and the particular search query has an actual query count that is less than the expected mobile query count, then the particular search query will not be classified as a local query for mobile devices.

The similar geographic feature subsystem 120 can use the non-zero entries in the excess query count column 320 in comparisons with similar data for other geographic features (e.g., other cities) to determine similar geographic features. For example, similar excess query count data can exist for other cities for the same queries (e.g., $Q_5$, $Q_6$, and $Q_8$-$Q_{10}$). Further, other cities, for example, may have excess queries for other queries in the set of queries $Q_1$-$Q_{10}$, namely any of the queries $Q_1$-$Q_4$ and $Q_7$ which had no excess queries in the current example. Moreover, multiple time periods can be used, for example, for comparing excess query counts for multiple geographic features over multiple time periods. By comparing the queries for different geographic features (e.g., cities) in this way, the similar geographic feature subsystem 120 can, for example, identify similar geographic features, each of which having potentially related sets of excess queries over time. Doing so can result in a determination that one or more similar geographic features exist for a given geographic feature. As an example, the similar geographic feature subsystem 120 can determine that, for a city such as San Francisco, other cities such as Fresno are similar, where the similarity exists because users in both cities generate similar local or geographically-based queries, as determined from excess query counts over time.

FIG. 3C is a block diagram illustrating excess query counts for different geographic features over multiple time periods. For example, the similar geographic feature subsystem 120 can determine the excess query counts as described previously with reference to FIGS. 3A and 3B. In the example shown in FIG. 3C, the excess query counts are divided into three separate data tables 332a, 332b and 332c that correspond to Cities A, B and C, respectively. Each of the data tables 332a, 332b, 332c includes columns of excess query counts that correspond to multiple time periods 334a-334d. The values listed for City A's excess query counts in the first time period 334a, for example, correspond to the values in the excess query count column 320 from the table 314 (see FIG. 3B). The process described previously in reference to FIGS. 3A and 3B can be repeated for the other three time periods 334b-334d for City A's data table 332a. The process can also be used for all four time periods 334a-334d to determine the excess query counts for City B's data table 332b and City C's data table 332c. The three cities, four time periods and ten queries used in FIG. 3C represent just a small sample of a universe of excess query counts. For example, many thousands of cities (or other geographic features) can be used, as well as many hundreds or thousands of time periods, and potentially millions of queries.

In some implementations, the similar geographic feature subsystem 120 can store the excess query counts for each geographic feature (e.g., each city) in two-dimensional arrays. For example, referring to FIG. 3C, the data tables 332a, 332b, 332c show storage of the excess query counts the Cities A, B and C as arrays with a query dimension (e.g., the queries $Q_1$-$Q_{10}$) and a time dimension (e.g., the time periods 334a-334d). Other dimensions and storage methods can be used for the storage of the excess query counts, such as using three dimensions, where the dimensions are queries, time periods, and geographic features, and indexes can exist for any or all of the dimensions.

In some implementations, the multiple time periods used for counting and analyzing excess queries, such as the time periods 334a-334d, can be separated in time by one or more intervals. For example, the time period 334a can be an hour-long time period that is separated by several hours, days, weeks or months from any other time periods, including the time periods 334b-334d. In some implementations, the query analysis subsystem 120, for example, can select time periods that provide a sufficiently representative number of queries for analysis. For example, for the query Yosemite, time periods can be selected that contain hundreds or thousands or more queries, as opposed to shorter time periods that include only few queries, which may not lead to useful analyses of the excess query counts. Similar cities can be determined from the excess query counts shown in FIG. 3C. For example, for the Cities A and B having excess query counts listed in data tables 332a and 332b, respectively. Specifically, a similarity exists between the two Cities A and B for the queries $Q_5$ and $Q_8$ for all four time periods. For example, the City A data table 332a includes, for the query $Q_5$, excess query counts of 2000, 4000, 6000 and 2000 over the four time periods. Similarly, the City B data table 332b includes, for the same query $Q_5$, excess query counts of 1000, 1800, 2900 and 900. While City B's numbers are not equal to the numbers for City A, they have been determined by the similar geographic feature subsystem 120 to represent similar excess queues.

Some implementations can compute and store excess query count values (e.g., in the data table 332a-332c) as relative values, e.g., percentages of expected counts. As a result, while City B's excess query count values are lower in an absolute sense, they may in fact represent relatively the same or a larger percentage relative to the expected counts. For example, each the query $Q_5$ excess query counts for Cities A and B, when treated as a percentage of expected counts, may be 20% or greater, indicating that Cities A and B are similar cities, at least when taking the query $Q_5$ into account.

However, two cities that have only one commonality, e.g., based on the query $Q_5$ excess query counts for a given time period, may not necessarily lead to a determination that the cities are similar. Other similarities in the excess query counts may also need to exist. For example, referring to the data tables 332a and 332b in FIG. 3C, similar excess query counts for Cities A and B can also be determined to exist also for the query $Q_8$ over all four time periods. The commonality for the query $Q_8$ and other queries over several time periods can be sufficient for the similar geographic feature subsystem 120 to make a conclusion 336 that City B is a similar geographic feature to City A. For example, the conclusion can be based at least in part on the values in the data tables 332a and 332b that are bolded for the queries $Q_5$ and $Q_8$ over all four time periods.

In some implementations, comparing geographic features for similarity can include determining a similarity threshold equal to a minimum number of excess queries that must be shared between two geographic features in order to find a similarity. For example, in order for the similar geographic feature subsystem 120 to determine that San Francisco and Boston are geographically similar, a pre-determined minimum number of excess queries (e.g., five, ten, 100, etc.) must be shared, not just two (e.g., the queries $Q_5$ and $Q_8$). Specifically, San Francisco and Boston, to be considered similar geographic features, must share a number of excess queries that is greater than the similarity threshold (e.g., five, ten, 100, etc.). In some implementations, similarity can also be determined using a weighted measure of the shared excess scores. For example, if San Francisco had 300 excess terms with excess percentages ranging from 1% to 20%, and Boston had 200 excess terms with excess percentages in the same range, then the determination of whether or not San Francisco and Boston are similar can be based on the pure overlap in these excess lists, as described previously (e.g., 100 shared excess queries). In some implementations similarity can be based on an average percentage of shared excess queries (e.g., (100/200+100/300) I 2=41.7% shared excess). In some implementations similarity can be based on a weighted percentage. For example, if all the shared excess queries were at 20% excess for both locations, and if all non-overlapping excess queries were at 1% excess in both locations, then the weighted excess measure would be (100*0.2/(100*0.2+100*0.01)+100/(100*0.2+200*0.01))/2=93%.

In some implementations, the similar geographic feature subsystem 120 can also consider dissimilar, or mismatched, excess queries when determining whether a candidate geographic feature (e.g., Jackson, Miss.) is a similar geographic feature to the target geographic feature (e.g., San Francisco). A dissimilar excess query can be, for example, a significantly large excess query for the target geographic feature and a zero or insignificant excess query for the candidate geographic feature. For example, referring to FIG. 3C, City C's data table 332c (e.g., which can represent Jackson, Miss.) includes excess query counts in the thousands for the queries $Q_1$, $Q_3$ and $Q_6$. These values are dissimilar to the values in City A's data table 332a (e.g., San Francisco), which has zero or null values for queries $Q_1$ and $Q_3$, and values in the low hundreds for the query $Q_6$. The query analysis subsystem 120, for example, can use these dissimilarities to determine that City A (e.g., San Francisco) is dissimilar to City C (e.g., Jackson, Miss.). This determination can be made by considering the dissimilarities for the queries $Q_1$, $Q_3$ and $Q_6$, in combination, in spite of a single shared set of excess query counts for the query $Q_8$.

In some implementations, when dissimilar excess queries are used in determining whether geographic features are similar, one or more dissimilarity thresholds can be used. For example, one type of dissimilarity threshold can specify that a certain number of dissimilar excess query counts (e.g., ten or more) can result in determining that the geographic features are not similar, regardless of excess query counts. In another example, a different type of dissimilarity threshold can specify that a certain percentage of dissimilar excess query counts (e.g., 50% or more) relative to similar excess query counts can result in determining that the geographic features are not similar. For example, even if N similar excess query counts are shared between geographic features, if N/2 dissimilar excess query counts also exist, then the similar geographic feature subsystem 120 can determine that the geographic features are not similar. In either example, if the dissimilarity thresholds are not met, then the geographic features can be determined to be similar.

Some implementations can consider the quality of the excess queries shared by a target geographic feature and a candidate geographic feature. For example, a higher quality of the excess queries shared between two or more geographic features can increase the likelihood that the geographic features will be determined to be similar. In some implementations, one measure of quality can be the query volume associated with excess queries. Example volume measurements can include an absolute number (e.g., the difference between a geo-query count and the corresponding expected query count) and a relative number (e.g., the percentage by which a geo-query count exceeds the corresponding expected query count). For example, a particular excess query in which the geo-query count exceeds its corresponding expected query count, e.g., by 300%, can be said to have a higher quality than a second excess query in which the geo-query count exceeds its corresponding expected query count by just 20%. In some implementations, other measures of quality can be used in addition to the query volume, and qualities can be summed or averaged over a set of excess queries that are shared. In some implementations, the presence of higher-quality similar excess queries between two geographic features can offset, at least in part, dissimilar excess queries. In some implementations, determining whether geographic features are similar can include examining the quality of clusters of query terms (e.g., clustered according to semantics or meaning) and comparing clusters' weights across cities, for example.

In some implementations, one of the reasons for determining similar geographic features can be to serve content (e.g., ads) to one or more of the similar geographic features based on those features' similarities to one or more other features. For example, an ad campaign that has been targeted to a city on the West Coast (e.g., San Francisco) may be very successful, e.g., leading to significant numbers of impressions, clicks and conversions. In light of the successful campaign, advertisers may want to target the same or similar content (e.g., ads) to other similar cities. For example, if an ad campaign related to high-tech medical products is popular ads in the San Francisco area, e.g., based on user reactions to the ad, then the advertisers may want to run the same ad campaign in Boston. San Francisco and Boston may be determined to be similar geographic features (e.g., cities), for example, based on analysis performed by the query analysis subsystem 120.

In another example, users in the San Francisco area may submit a higher than average number of queries for Yosemite, as determined by excess query counts for queries that include Yosemite as a search term. In an effort to reach a higher population of users interested in Yosemite, publishers and advertisers can target Yosemite-related content, including ads, to users in geographic features (e.g., other cities) that are similar to the San Francisco area. The targeting to similar cities can include, for example, Yosemite-related ads (e.g., hotels and activities in the Yosemite area) and content. In the case of content, Yosemite-related content can be ranked higher in a user's set of search results. In the case of ads, for example, the relevancy of an ad can be boosted, increasing the possibility that a Yosemite-related ad is selected for an ad impression.

Similar geographic features, e.g., Cities A and B, can be used to determine labels or keywords by which to select ads. In some implementations, the similar geographic features can be used to generate targeting information when, for example, the content on a web page is insufficient in determining keywords. For example, if the location for which labels are to be determined is in the area of City A, then labels corresponding to City B can be selected to be used as targeting information. As a result, ads can targeted to a user in City A even without having content available by which to extract keywords that would otherwise be used for targeting ads. In some implementations, other types of content, in addition to ads, can be targeted and served in this way.

Figure 4:
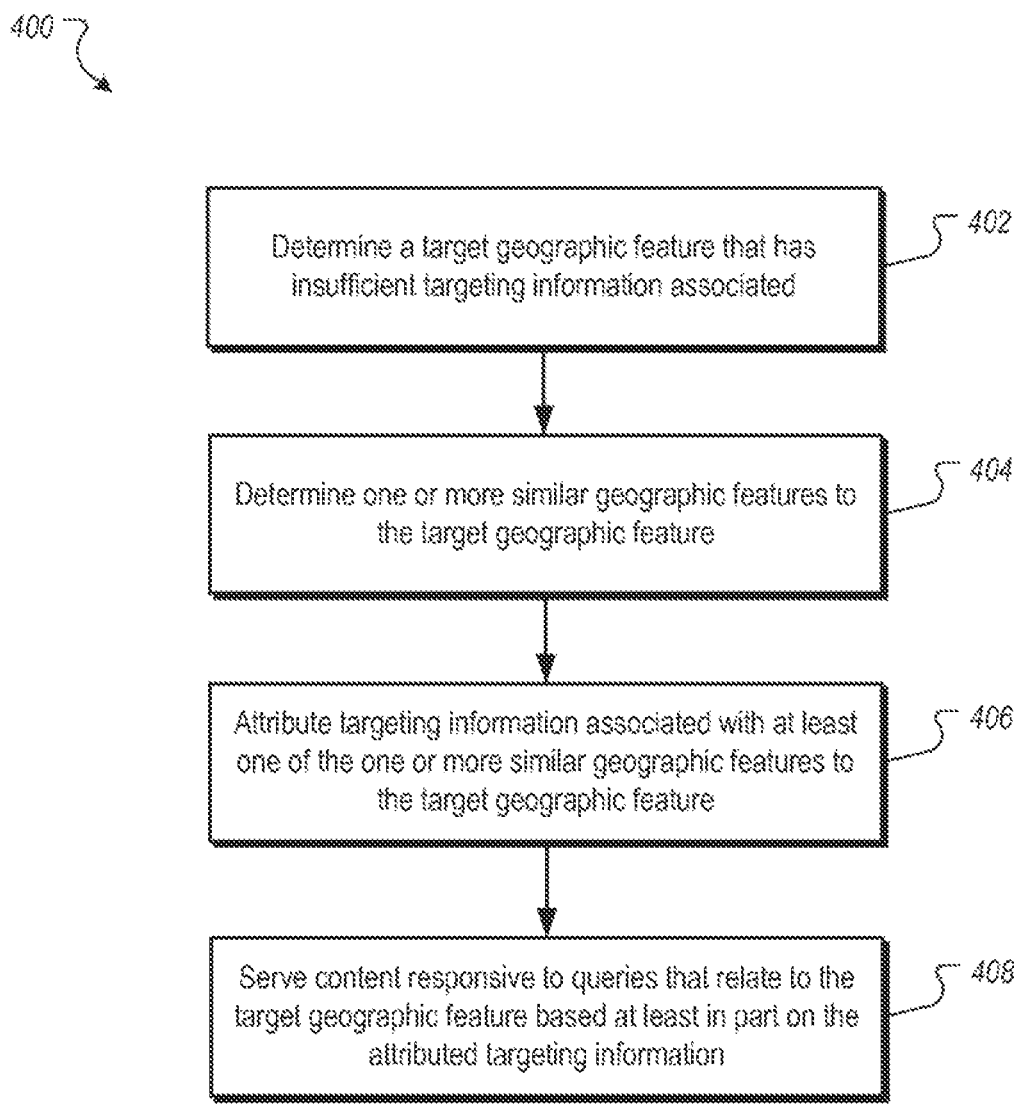
FIG. 4 is a flow chart of an example process for serving content using targeting information obtained from similar geographic features.

FIG. 4 is a flow chart of an example process 400 for serving content using targeting information obtained from similar geographic features. The process 400 is a process by which targeting information can be determined for a geographic feature that has insufficient targeting information. For example, the geographic feature can be the location from which a user enters a query, or a location in which the user is interested. If insufficient targeting information exists for the location, thus not providing sufficient keywords for which to target ads or other content, then targeting information can be obtained from geographic features that are similar to the geographic feature (e.g., associated with the location).

The process 400 can be implemented, for example, by the similar geographic feature subsystem 120 and/or the search system 110 of FIG. 1. In some implementations, the similar geographic feature subsystem 120 is a data processing apparatus that includes one or more processors that are configured to perform actions of the process 400. In other implementations, a computer readable medium can include instructions that, when executed by a computer, cause the computer to perform actions of the process 400.

A target geographic feature that has insufficient targeting information associated therewith is determined (402). The target geographic feature defines a location. As an example, a user of a user device 106 may select an online map application or service, such as to display a map and to obtain driving directions to a user-specified location. When the web page for the online map application is displayed on the user's user device 106, an attempt can be made to serve ads targeted to the user, e.g., based on keywords. For example, as can often be the case for online map applications and some other websites, little if any content is served (e.g., except for a map and, potentially, driving directions) from which to obtain keywords for targeting one or more ads to the user. However, a location can often be determined, such as from the current location of the user device 106 or from other sources, as described previously. For example, the location can be determined from location names embedded within driving directions presented by the online map application. Knowledge of the location, however, can still result in having insufficient targeting information from which to target an ad to the user. As such, the location becomes the target geographic feature for which to find targeting information, e.g., from other sources, such as other geographic features.

One or more geographic features that are similar to the target geographic feature are determined (404). Each geographic feature includes targeting information. The determination is based on shared excess queries that are shared between the geographic features that are determined to be similar to the target geographic feature, wherein each excess query is a query associated with and exceeds an expected query count for each of the similar geographic features and the target geographic feature. For example, if the target geographic feature is a place in remote Wyoming, then geographic features that are similar to that Wyoming location can be accessed. As another example, referring to FIG. 3C, a geographic feature (e.g., City A) can have one or more similar geographic features (e.g., City B). In some implementations, the similar geographic features can be determined using excess queries, as described with respect to FIGS. 3A-3C. In some implementations, similarities between geographic features can be represented by a graph that connects nodes, where one or more nodes can represent various geographic features that are related by proximity, as described previously with reference to FIG. 2. Furthermore, the nodes in the graph can be connected by edges in the graph, where each edge represents a label that is common between the two nodes. For example, the graph can connect nodes that are g-cells in a hierarchical representation or mapping of geographic areas, as described with reference to FIG. 2. In this way, geographic features can be identified that are similar to the location (e.g., the Wyoming location) associated with the online map application, which is the target geographic feature in this example.

Targeting information associated with at least one of the one or more similar geographic features is attributed to the target geographic feature (406). For example, the targeting information can be obtained from the labels (e.g., keywords) that result from a graph-based propagation system for propagating labels to adjacent g-cells, as described previously with reference to FIG. 2. Specifically, the targeting information, e.g., labels, can be propagated to the one or more nodes in the graph that represent the target geographic feature. The labels can have been propagated from other nodes in the graph, e.g., by the absorption process and stored in the nodes as scaled scores, as described previously. The labels can be propagated from nodes in the graph that correspond to adjacent or nearby g-cells that map locations on the Earth, or from nodes that represent similar geographic features whose similarities are based on shared excess queries, for example. In this way, labels can be obtained that can be used as keywords to serve ads or other content targeted to the user in remote Wyoming.

Content is served that is responsive to queries that relate to the target geographic feature based at least in part on the attributed targeting information (408). For example, when the map applications or other website is rendered on the user device 106, an ad or other content is also served. The targeting of the ad in this case can be based on targeting information obtained from other geographic features that are similar (e.g., by location or query) to the target geographic feature. As a result, the user in Wyoming can be served ads that are targeted to the user because of similarities between the user's location (e.g., Wyoming) and similar geographic features from which the labels needed for targeting are obtained.

Figure 5:
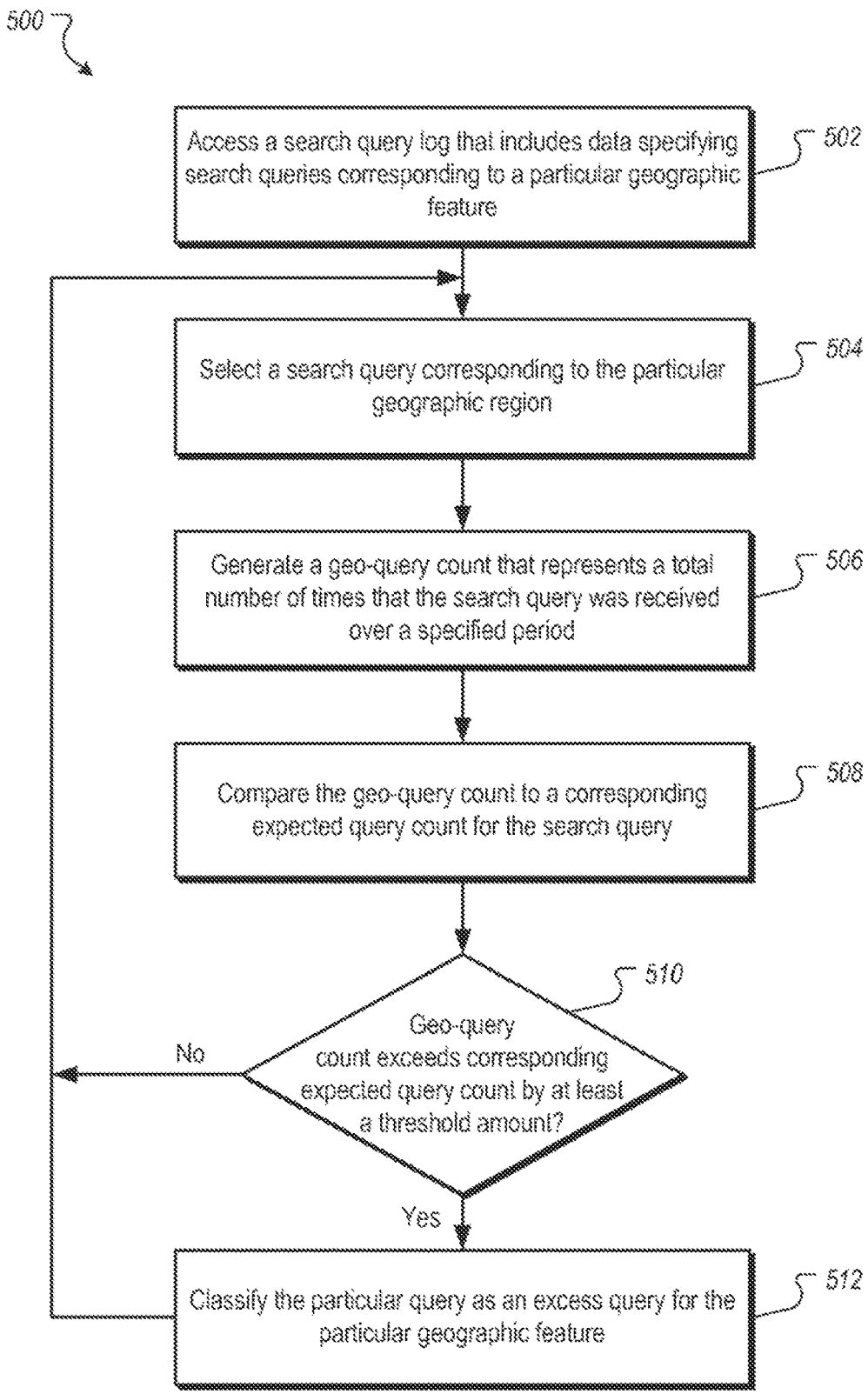
FIG. 5 is a flow chart of an example process for determining excess queries.

FIG. 5 is a flow chart of an example process 500 for identifying excess queries. The process 500 can be implemented, for example, by the similar geographic feature subsystem 120 and/or the search system 110 of FIG. 1. For example, the process 500 can be used to determine the excess queries that are identified in the data tables 332a-332c.

A search query log that includes data specifying search queries corresponding to a particular geographic feature is accessed (502). The geographic feature defines a location. As an example, the similar geographic feature subsystem 120 can access information for search queries for a particular geographic feature (e.g., San Francisco). The information for the search queries can be obtained, for example, from the search log data store 118.

In some implementations, the search log data store 118 can include the queries that have been identified as queries that were received from user devices located in the particular geographic region. In some implementations, the search log data store 118 can include search queries that have been received from many different geographic regions. In some implementations, the search log data store 118 can be filtered to select the search queries that are identified as queries received from a user device in the particular geographic region.

For example, as described previously, each search query can have a geographic identifier appended to or otherwise associated with it, where the geographic identifier represents a location of the user device that submitted the search query. In some implementations, search queries for a particular geographic region can be selected by filtering the search query log to remove search queries that do not have the geographic identifier representing the particular region. Thus, the search queries that remain in the filtered search query log will each correspond to the particular region.

A search query corresponding to the particular geographic region is selected (504). For example, referring to FIG. 3A, the similar geographic feature subsystem 120 can select one of the queries (Q1-Qi) (e.g., the query Q1) from the search query log 302.

A geo-query count is generated that represents a total number of times that the search query was received over a specified period (506). As described previously, the geo-query count for a search query represents a total number of times that the search query was received from the current geographic feature (e.g., San Francisco), for example, over a specified period (e.g., one or more hours, days, weeks, etc.). For example, the similar geographic feature subsystem 120 can compute the geo-query count based on a number of instances of the search query in the search query log 302 that have the geographic identifier corresponding to the particular geographic region (e.g., San Francisco). Referring to FIG. 3B, for example, the similar geographic feature subsystem 120 can store the geo-query count in the actual query count column 316. For example, the geo-query count for the query Q1, as shown in the actual query count column 316, is 7,000.

In some implementations, the geo-query count can also be obtained from the search query log 302. For example, the search query log 302 can include a reference to the search query and a value representing a number of times that the search query was received from user devices in the specified geographic region and/or other geographic regions.

The geo-query count is compared to a corresponding expected query count for the search query (508). For example, the similar geographic feature subsystem 120 can compare the geo-query count for the query Q1, (e.g., 7,000, as shown in the actual query count column 316) to the expected query count for the same query Q1, (e.g., 10,000, as shown in the expected query count column 318).

In some implementations, the expected query count is a baseline number of times that the query is expected to be received, over the specified period, from user devices located in the specified geographic region (e.g., the San Francisco area). As described previously, the expected query count for a query can be computed based on a query share for the query and a total number of queries that were received, over the specified period, from user devices located in (or corresponding to) the specified geographic region.

A determination is made whether the geo-query count exceeds the corresponding expected query count by at least a threshold amount (510). For example, the similar geographic feature subsystem 120 can determine whether the geo-query count (e.g., 7,000) for the query $Q_1$ exceeds the expected query count (e.g., 10,000) for the same query $Q_1$. If geo-query count does not exceed the corresponding expected query count by at least a threshold amount (e.g., 1000), then the next search query is selected (504).

In response to a positive determination, the particular search query is classified as an excess query for the particular location (512). In some implementations, classifying the search query as an excess query for the particular geographic feature includes storage of the excess query count and/or a designation that the query is an excess query. The process 500 can continue for other queries when the next query is selected (504).

Figure 6:
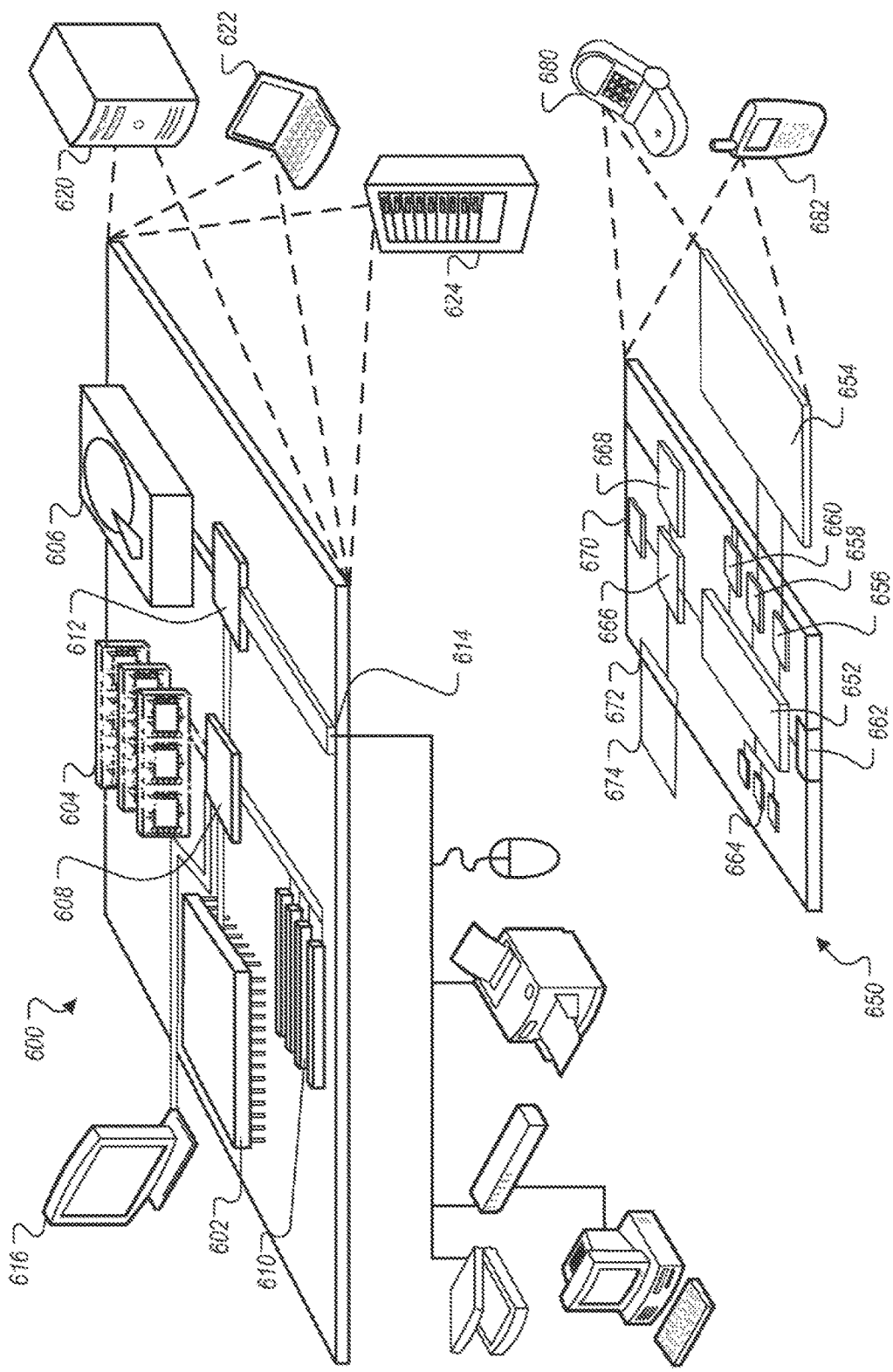
FIG. 6 is a block diagram of computing devices that may be used to implement the systems and methods described in this document.

FIG. 6 is a block diagram of computing devices 600, 650 that may be used to implement the systems and methods described in this document. The computing devices 600, 650 may be implemented as one or more clients or one or more servers, or combinations of clients and servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described previously. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described previously, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described previously. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described previously as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described previously should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:

determining, by one or more computing devices, a target geographic feature that does not initially have associated targeting information for providing targeted content associated with the target geographic feature, the target geographic feature defining a first geographic area;

determining, by the one or more computing devices, one or more similar geographic features to the target geographic feature based at least in part on a comparison of query counts for each of a plurality of geographic features, the one or more similar geographic features defining one or more geographic areas distinct from the first geographic area, the one or more similar geographic features having associated targeting information;

attributing, by the one or more computing devices, targeting information associated with at least one of the one or more similar geographic features to the target geographic feature; and providing, by the one or more computing devices, related targeted content responsive to one or more queries that relate to the target geographic feature, the related targeted content identified based at least in part on the attributed targeting information.

2. The method of claim 1, wherein geographic proximity is not a factor in determining, by the one or more computing devices, one or more similar geographic features.

3. The method of claim 1, wherein one or more geographic features of the plurality of geographic features is a city.

4. The method of claim 1, wherein each geographic feature in the plurality of geographic features is a cell in a hierarchical representation of geographic areas.

5. The method of claim 1, wherein the targeting information comprises labels.

6. The method of claim 5, wherein the labels are keywords.

7. The method of claim 1, further comprising:
creating a graph of geographic features where 1) each vertex in the graph is one of the plurality of geographic features, 2) edges of the graph that connect the geographic features are weighted, and 3) geographic features that are found to be similar are connected in the graph; and
propagating labels over the graph.

8. The method of claim 7, wherein propagating labels over the graph includes:
at each vertex, initializing the labels associated therewith to an equal weight summing to a predetermined number;
sending the labels across all connections associated with a given vertex;
at each vertex, aggregating the labels received including scaling the weights of the labels; and
repeating the sending until label weights stop changing over the graph.

9. The method of claim 1, wherein an excess query count is determined for one of the plurality of geographic features based at least in part on a number of geo-queries that exceed a computed expected query count for the geographic feature.

10. The method of claim 9, wherein determining, by the one or more computing devices, one or more similar geographic features to the target geographic feature comprises determining, by the one or more computing devices, one or more similar geographic features to the target geographic feature based at least in part on a comparison of excess query counts over different time periods for each of the plurality of geographic features.

11. The method of claim 1, wherein determining, by the one or more computing devices, one or more similar geographic features to the target geographic feature comprises comparing, by the one or more computing devices, a number of dissimilar excess queries for the target geographic feature and a candidate geographic feature to a dissimilarity threshold.

12. The method of claim 11, wherein comparing, by the one or more computing devices, a number of dissimilar excess queries comprises determining, by the one or more computing devices, that the target geographic feature and candidate geographic feature are not similar when the number of dissimilar excess queries exceeds a dissimilarity threshold.

13. A computing system, comprising:
one or more processors; and
one or more memory devices, the one or more memory devices storing computer-readable instructions that when executed by the one or more processors cause the one or more processors to perform operations, the operations comprising:
determining a target geographic feature that does not initially have associated targeting information to provide targeted content associated with the target geographic feature, the target geographic feature defining a first geographic area;
determining one or more similar geographic features to the target geographic feature based at least in part on a comparison of query counts for each of a plurality of geographic features, the one or more similar geographic features defining one or more geographic areas distinct from the first geographic area, the one or more similar geographic features having associated targeting information;
attributing targeting information associated with at least one of the one or more similar geographic features to the target geographic feature; and
providing related targeted content responsive to one or more queries that relate to the target geographic feature, the related targeted content identified based at least in part on the attributed targeting information.

14. The system of claim 13, wherein geographic proximity is not a factor in determining, by the one or more computing devices, one or more similar geographic features.

15. The system of claim 13, the operation of determining one or more similar geographic features to the target geographic feature comprises determining one or more similar geographic features to the target geographic feature based at least in part on a comparison of excess query counts over different time periods for each of the plurality of geographic features, wherein an excess query count is determined for one of the plurality of geographic features based at least in part on a number of geo-queries that exceed a computed expected query count for the geographic feature.

16. The system of claim 13, wherein the operation of determining one or more similar geographic features to the target geographic feature comprises comparing a number of dissimilar excess queries for the target geographic feature and a candidate geographic feature to a dissimilarity threshold.

17. One or more non-transitory computer-readable media storing computer readable instructions that when executed by one or more processors cause the one or more processors to perform operations, the operations comprising:
determining a target geographic feature that does not initially have associated targeting information to provide targeted content associated with the target geographic feature, the target geographic feature defining a first geographic area;
determining one or more similar geographic features to the target geographic feature, based at least in part on a comparison of query counts for each of a plurality of geographic features, the one or more similar geographic features defining one or more geographic areas distinct from the first geographic area, the one or more similar geographic features having associated targeting information;
attributing targeting information associated with at least one of the one or more similar geographic features to the target geographic feature; and providing related targeted content responsive to one or more queries that relate to the target geographic feature, the related targeted content identified based at least in part on the attributed targeting information.

18. The one or more tangible non-transitory computer-readable media of claim 17, wherein geographic proximity is not a factor in determining, by the one or more computing devices, one or more similar geographic features.

19. The one or more tangible non-transitory computer-readable media of claim 17, the operation of determining one or more similar geographic features to the target geographic feature comprises determining one or more similar geographic features to the target geographic feature based at least in part on a comparison of excess query counts over different time periods for each of the plurality of geographic features, wherein an excess query count is determined for one of the plurality of geographic features based at least in part on a number of geo-queries that exceed a computed expected query count for the geographic feature.

* * * * *